United States Patent [19]

Grab

[11] Patent Number: 5,348,666
[45] Date of Patent: Sep. 20, 1994

[54] METHOD FOR STABILIZING GLUTARALDEHYDE IN AQUEOUS SYSTEMS

[75] Inventor: Lawrence A. Grab, New Milford, N.J.

[73] Assignee: Union Carbide Chemicals & Plastics Technology Corporation, Danbury, Conn.

[21] Appl. No.: 40,899

[22] Filed: Mar. 31, 1993

[51] Int. Cl.$^5$ .............................................. C09C 1/42
[52] U.S. Cl. ................... 210/754; 106/447; 106/465; 106/487; 210/758; 210/759; 210/764; 514/698
[58] Field of Search ........... 106/465, 487, 447; 162/161; 210/754, 755, 758, 759, 764; 514/693, 698

[56] References Cited

U.S. PATENT DOCUMENTS

| | | | |
|---|---|---|---|
| 3,509,499 | 3/1970 | Allegrini et al. | 106/486 |
| 3,519,454 | 7/1970 | Sawyer et al. | 106/486 |
| 4,539,071 | 9/1985 | Clifford et al. | 106/15.05 |
| 4,802,994 | 2/1989 | Mouche et al. | 210/759 |
| 4,975,109 | 12/1990 | Friedman, Jr. et al. | 71/67 |
| 5,004,749 | 4/1991 | Jerusik et al. | 514/372 |

FOREIGN PATENT DOCUMENTS

2335243  8/1977  France .

*Primary Examiner*—Peter A. Hruskoci

[57] ABSTRACT

A method is disclosed for stabilizing glutaraldehyde in aqueous systems is disclosed. The method of the invention comprises the addition of an oxidizer to the aqueous system so as to prevent the undesired conversion of glutaraldehyde to non-biocidal products.

16 Claims, 6 Drawing Sheets

METHOD FOR STABILIZING GLUTARALDEHYDE IN AQUEOUS SYSTEMS

FIELD OF THE INVENTION

The invention relates to a method for controlling biological activity in aqueous systems. More specifically this invention relates to a method for controlling the growth of microorganisms in aqueous systems containing a mineral slurry such as kaolin through the use of glutaraldehyde.

BACKGROUND OF THE INVENTION

Kaolin is a fine grained white clay that upon processing can be used in an assortment of industrial applications such as paper coatings and fillers for paints and plastics. The paper industry consumes the largest amount of kaolin where it is used as both a filler and pigment slurry to improve the quality of printing.

Kaolin is typically shipped as an aqueous-based slurry with a 50 to 70% by weight solids content. In order to maintain the integrity of the slurry, preservatives are added to prevent microbiological contamination during shipment to the end user. Failure to treat these slurries can lead to discoloration, sulfide production, pH and viscosity drifts and loss of brightness. While; all of the biocides used in the kaolin area are effective under ideal laboratory conditions, the interaction of the clay and/or its components with the biocides can render them ineffective. For example, isothiazolinones including 5-chloro-2-methyl-4-isothiazolin-3-one and 1,2-benzisothiazolinone have been shown to be unstable in certain kaolin slurries. This phenomenon is not surprising as clay interactions with organic compounds and clay-activated organic reactions have been well documented in the literature.

Glutaraldehyde has been in use as a biocide for kaolin slurries for over six years. While it is stable and effective in the great majority of the slurries, infrequent instances of incompatibility have been noted. Incompatibility as used herein is defined to mean the chemical instability of a biocide when added to a slurry, such that the concentration of the biocide in the slurry decreases relatively rapidly resulting in loss of antimicrobial effectiveness. An unstable slurry as used herein is one in which glutaraldehyde is incompatible. These sporadic occurrences of slurry instability have recently been found to be due to the unusual transformation of glutaraldehyde to δ-valerolactone, a non-biocidal compound. The literature has reported no precedent for a reaction of this type under mild conditions. Due to the complex nature of kaolin slurries, the cause of this unusual transformation has not been determined, despite extensive studies of the nature of the slurries in relationship to this problem. Consequently, there is no way to predict when this transformation will occur or how to prevent it from occurring.

Accordingly a need exists to provide a method to stabilize aqueous systems, such as kaolin slurries, for extended periods of time so that undesired microorganism growth does not degrade the properties of the mineral slurry.

SUMMARY OF THE INVENTION

The present invention provides a method of stabilizing aqueous systems by providing sufficient levels of an oxidizing agent to the aqueous system so as to prevent the undesired reaction of glutaraldehyde to form non-biocidal products. More particularly the present invention comprises a method for adding sufficient levels of an oxidizing agent to an aqueous-based mineral slurry in which glutaraldehyde has been added.

DETAILED DESCRIPTION OF THE INVENTION

Glutaraldehyde is a well known biocide to those with skill in the art. In practice glutaraldehyde is provided to an aqueous system in an "antimicrobially effective amount". By this term as used herein, it is meant at least the minimum amount of glutaraldehyde required to substantially kill or inhibit the growth of microorganisms. Also contemplated by the method of the invention is providing glutaraldehyde to the aqueous system in an amount to inhibit the regrowth or growth of such microorganisms. The particular amount of glutaraldehyde required varies depending on a number of factors including the species of microorganism, the contact time between glutaraldehyde and the microorganism and the aqueous system in which the glutaraldehyde is employed.

Generally glutaraldehyde can be employed in the method of this invention at concentrations up to about 1.0 weight percent, based upon the weight of the water and mineral slurry in the aqueous system to be treated. However, in view of its efficacy as a biocide against microorganisms and economic considerations, glutaraldehyde is usually used in amounts as low as from about 10 to about 1000 parts per million (ppm) and more usually from about 20 to about 500 ppm, by weight of water. Normally no more than 50 to about 250 ppm is required.

The amount of oxidizer provided to the glutaraldehyde aqueous system is in an amount sufficient to stabilize the glutaraldehyde. As used herein the term "sufficient to stabilize" is defined to mean at least the minimum amount of oxidizer required to substantially prevent the reaction of glutaraldehyde to nonbiocidal compounds such as delta-valerolactone. Generally, the oxidizer can be employed in the method of this invention up to about 1000 parts per million based upon the total weight of the system to be treated. Typically, the level of oxidizer provided is from about 5 to about 400 ppm and most preferably from about 10 to about 100 ppm.

Various well-known oxidizers can be employed in the method of the present invention. Suitable oxidizers include hydrogen peroxide, chlorine, bromine, potassium permanganate and the like. Especially preferred as an oxidizer is hydrogen peroxide.

A wide number of mineral slurries can be stabilized according to the method of the present invention. Illustrative of the mineral slurries which are stabilized include kaolin, calcium carbonate, titanium dioxide, bentonite clay slurries and the like. The present invention is especially well-suited to the stabilization of kaolin slurries.

The concentration of the mineral slurry in the aqueous system is not critical in the present method. The mineral level contained in the slurry may vary widely from about 5 to about 95 percent by weight, generally containing from about 25 to about 80 and most typically from about 50 to about 70 percent by weight.

Although glutaraldehyde is the biocide stabilized by the addition of the oxidizer, other biocides may also be employed. Illustrative of such other biocides include formaldehyde, chlorine dioxide, chloroisocyanurates, halogen-containing hydantoins, quaternary ammonium compounds, isothiazalones, bromonitroalkanols, organosulfur compounds and the like.

The aqueous systems that are treated by the method of this invention may contain a broad spectrum of microorganisms, including but not limited to bacteria, yeasts, fungi, molds and algae.

The oxidizer may be added to the aqueous system before, after or simultaneously with the glutaraldehyde addition. In a most preferred method the oxidizer is added to the aqueous system and sufficient time is provided to allow the oxidizer to disseminate throughout the aqueous system before the glutaraldehyde addition is made. Mixing techniques may also be employed to insure a more uniform distribution of the oxidizer throughout the aqueous system before the glutaraldehyde is added.

The long-term stability of glutaraldehyde is particularly important in treatment of various industrial processes involving aqueous systems, particularly those employing mineral slurries. An important example of such an industrial process includes shipment of mineral slurries, especially in vessels such as railroad cars, which are loaded, sealed and may remain closed for extended periods of times and may be exposed to various temperatures during transit.

The Examples which follow are presented for the purpose of illustrating the invention and are not to be construed as unduly limiting thereon. All parts and percentages are by weight unless otherwise specified.

DEFINITIONS

The following designations used in the Examples and elsewhere herein have the following meaning:
g - gram or grams
a. i.- active ingredient
rpm - revolutions per minute
BHI - Brain Heart Infusion
GA - glutaraldehyde
ppm- parts per million by weight

EXAMPLE 1

Glutaraldehyde instability in kaolin slurries

Glutaraldehyde (200 ppm a. i. ) was added to a 100 g sample of unstable kaolin slurry in a screw-capped bottle. The sample vial was then shaken and stored at ambient temperature (approximately 25° C.). At the desired time points a 10 g sample of the slurry was transferred to a centrifuge tube and centrifuged for 20 minutes at 10,000 rpm. The glutaraldehyde content of the resulting supernatant was then analyzed by gas chromatography.

Figure 1:
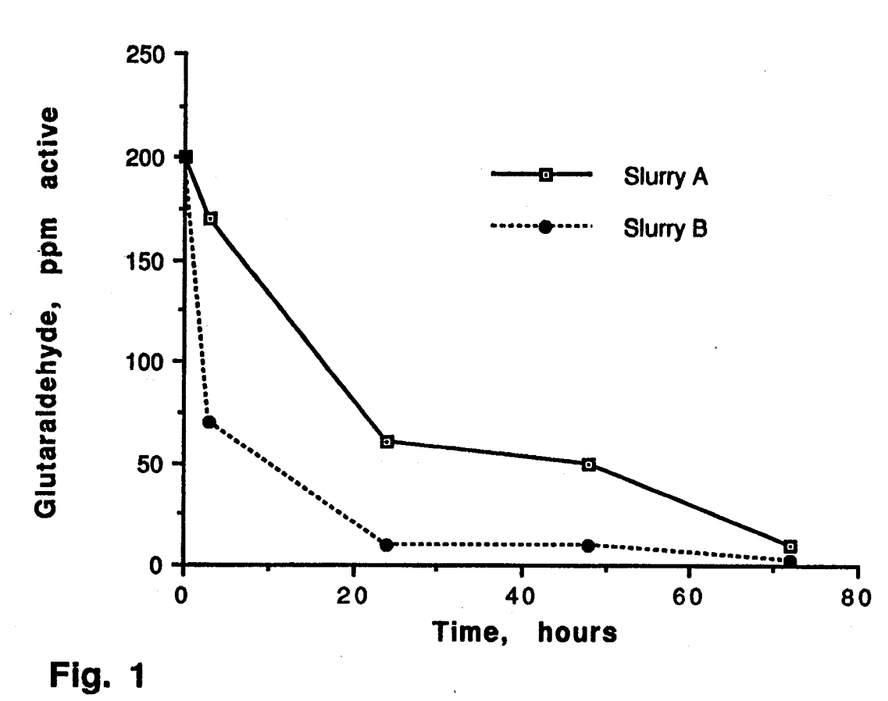
FIG. 1 is a graph demonstrating glutaraldehyde concentration in various unstable kaolin slurries as function of time.

FIG. 1 illustrates the stability of glutaraldehyde in two kaolin slurries in which the glutaraldehyde is converted to nonbiocidal products. The half-life of glutaraldehyde in unstable slurries can range from 4–24 hours. Rapid loss of glutaraldehyde was observed even with 1000 ppm a.i. additions of glutaraldehyde.

EXAMPLE 2

Isothiazolinone instability in kaolin slurries

To a 100 g sample of unstable kaolin slurry in a screw-capped bottle was added 100 ppm a.i. of 1,2 benzisothiazolinone or 15 ppm a.i. of a mixture of 5-chloro-2-methyl-4-isothiazolin-3-one and 2-methyl-4-isothiazolin-3-one on a weight/weight basis. The sample vial was then shaken and stored at 25 ° C. At the desired time points a 10 g sample of the slurry was transferred to a centrifuge tube and centrifuged for 20 minutes at 10,000 rpm. The content of the resulting supernatant was then analyzed by gas chromatography.

Figure 2:
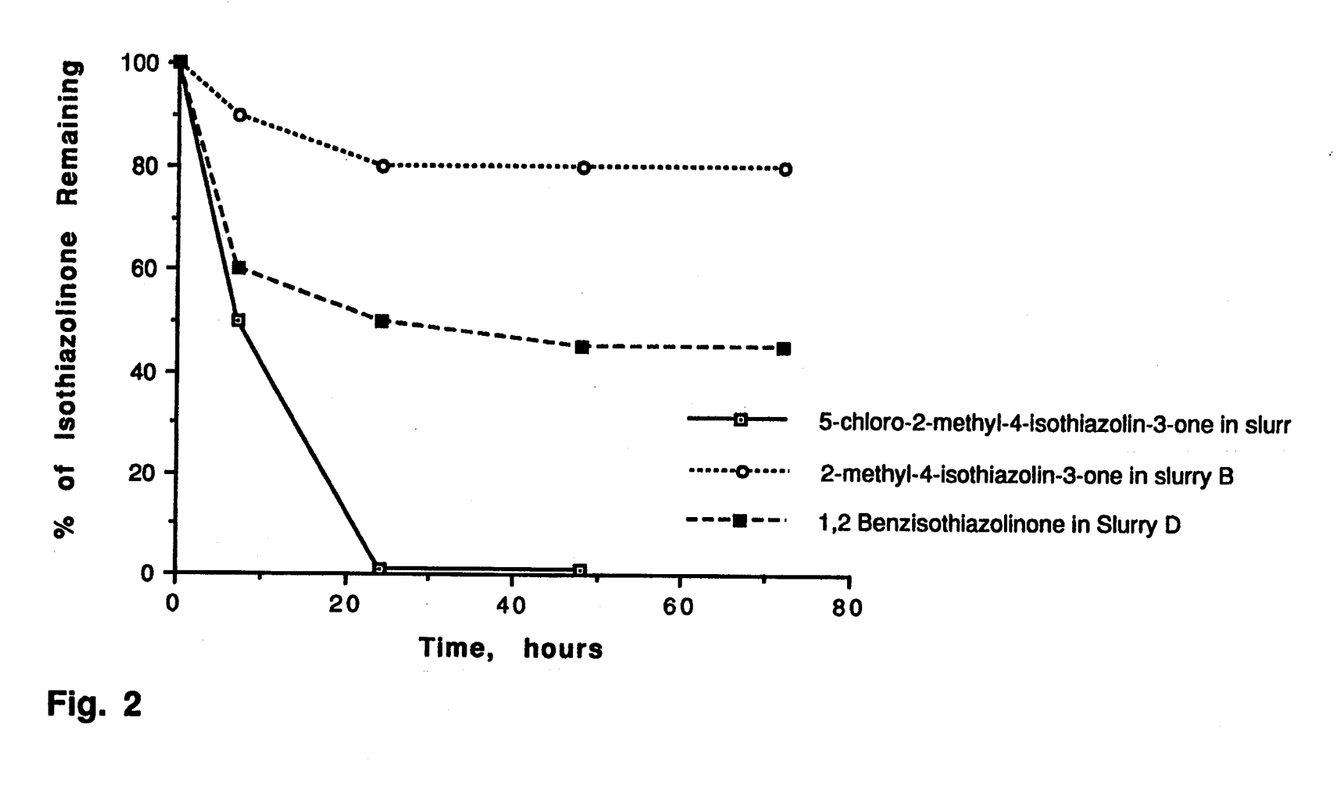
FIG. 2 is a graph demonstrating isothiazolinones concentration in kaolin slurries as a function of time.

FIG. 2 illustrates the stability of 1,2 benzisothiazolinone and a mixture of 5-chloro-2-methyl-4-isothiazolin-3-one and 2-methyl-4-isothizaolin-3-one in a kaolin slurry in which they are incompatible. The 5-chloro-2-methyl-4-isothiazolin-3-one isomer is biocidally more active than the 2-methyl-4-isothiazolin-3-one isomer and is also less stable in kaolin slurries.

EXAMPLE 3

Effect of hydrogen peroxide on glutaraldehyde stability

To a 100 g sample of unstable kaolin slurry in a screw-capped bottle was added the desired amount of a 1% solution of hydrogen peroxide followed by the addition of 200 ppm a.i. glutaraldehyde on a weight/weight basis. The sample vial was then shaken and stored at ambient temperature (approximately 25° C.). At the desired time points a 10 g sample of the slurry was transferred to a centrifuge tube and centrifuged for 20 minutes at 10,000 rpm. The glutaraldehyde content of the resulting supernatant was then analyzed by gas chromatography.

Figure 3:
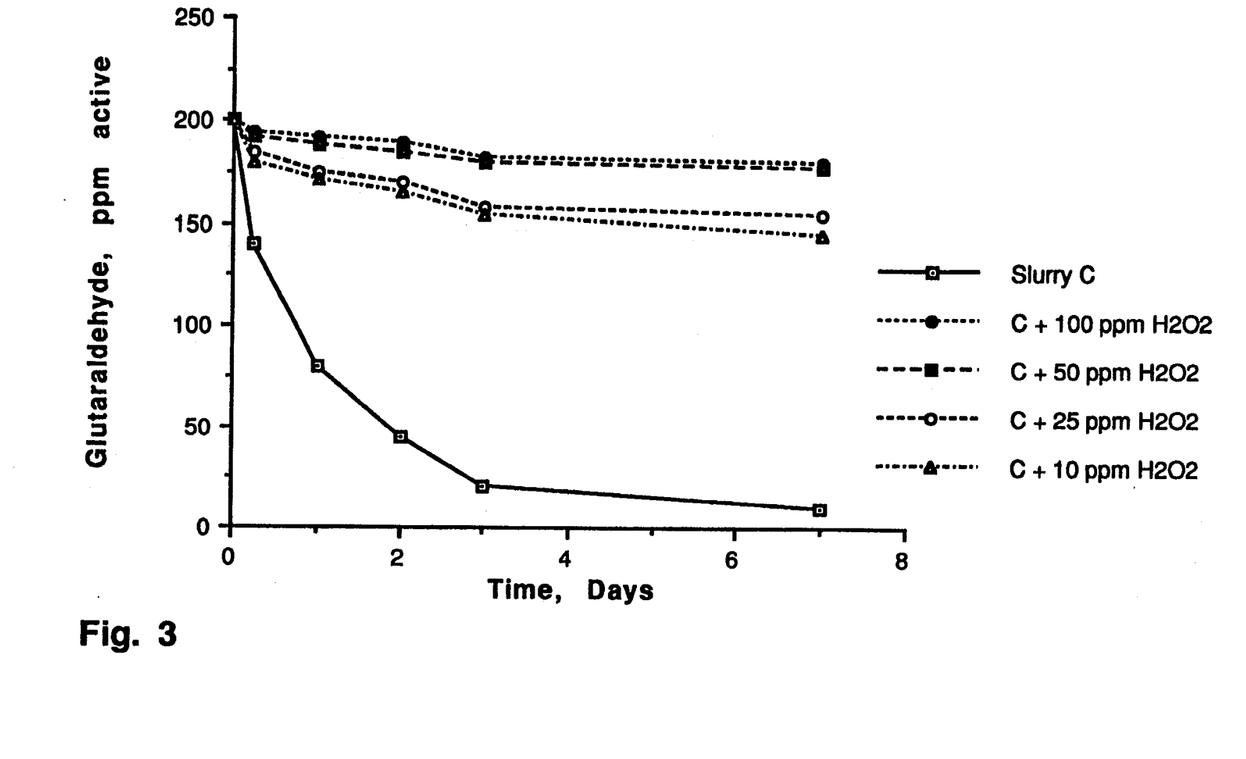
FIG. 3 is a graph demonstrating the concentration of glutaraldehyde stabilized with varying levels of hydrogen peroxide as a function of time.

The effect of different concentrations of hydrogen peroxide on the stability of glutaraldehyde in an incompatible kaolin slurry can be seen in FIG. 3. Hydrogen peroxide has a significant stabilizing effect on glutaraldehyde, with 90% of the glutaraldehyde remaining 7 days after treatment with 100 ppm of the peroxide.

EXAMPLE 4

Effect of hydrogen peroxide on isothiazolinone stability

To a 100 g sample of unstable kaolin slurry in a screwcapped bottle was added the desired amount of a 1% solution of hydrogen peroxide followed by the addition of 15 ppm a.i. of a mixture of 5-chloro-2-methyl-4-isothiazolin-3-one and 2-methyl-4-isothiazolin-3-one on a weight/weight basis. The sample vial was then shaken and stored at 25 ° C. At the desired time point a 10 g sample of the slurry was transferred to a centrifuge tube and centrifuged for 20 minutes at 10,000 rpm. The isothiazolinone content of the resulting supernatant was then analyzed by high performance liquid chromatography.

Figure 4:
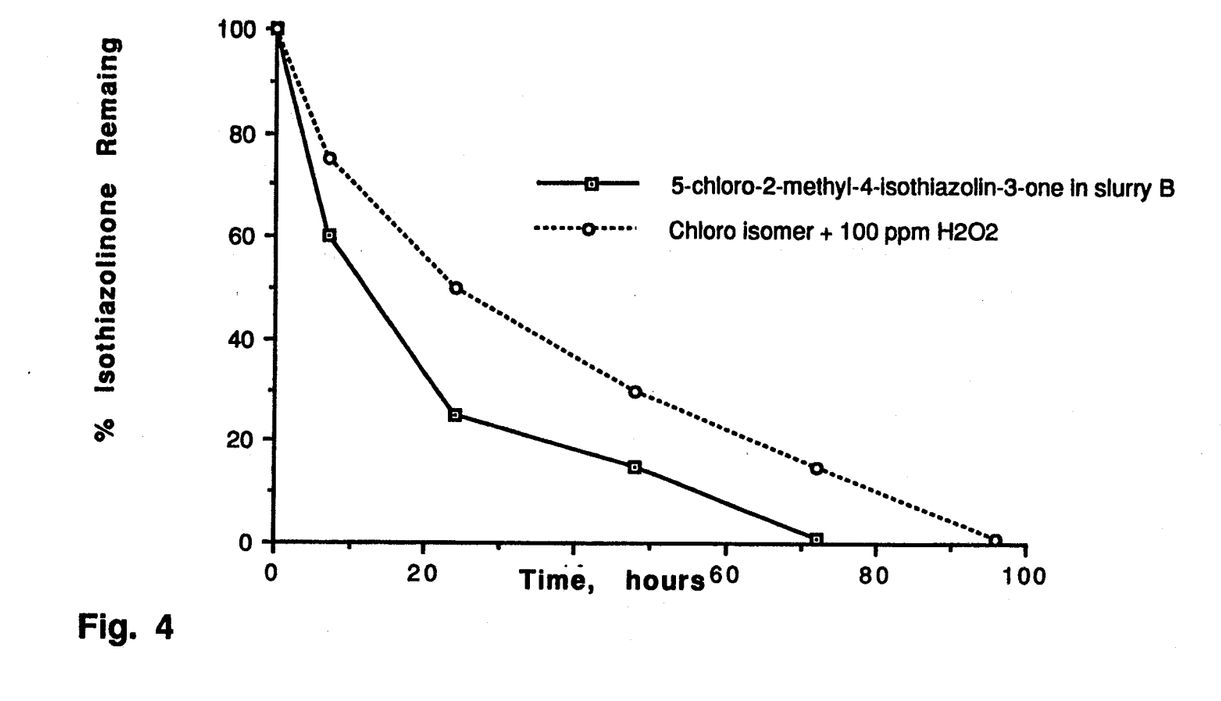
FIG. 4 is a graph demonstrating the percentage of isothiazolinone present in a kaolin slurry that has been treated with hydrogen peroxide as a function of time.

The effect of 100 ppm of hydrogen peroxide on the stability of 5-chloro-2-methyl-4-isothiazolin-3-one can be seen in FIG. 4. Unlike glutaraldehyde, no long term stability is afforded to the isothiazolione after treatment with hydrogen peroxide.

EXAMPLE 5

Effect of oxidizing agents on glutaraldehyde stability

To a 100 g sample of unstable kaolin slurry in a screw-capped bottle was added the desired amount of a 1% solution of oxidizer followed by the addition of 200 ppm a.i. glutaraldehyde on a weight/weight basis. The sample vial was then shaken and stored at 25° C. At the desired time point a 10 g sample of the slurry was transferred to a centrifuge tube and centrifuged for 20 minutes at 10,000 rpm. The glutaraldehyde content of the resulting supernatant was then analyzed by gas chromatography.

Figure 5:
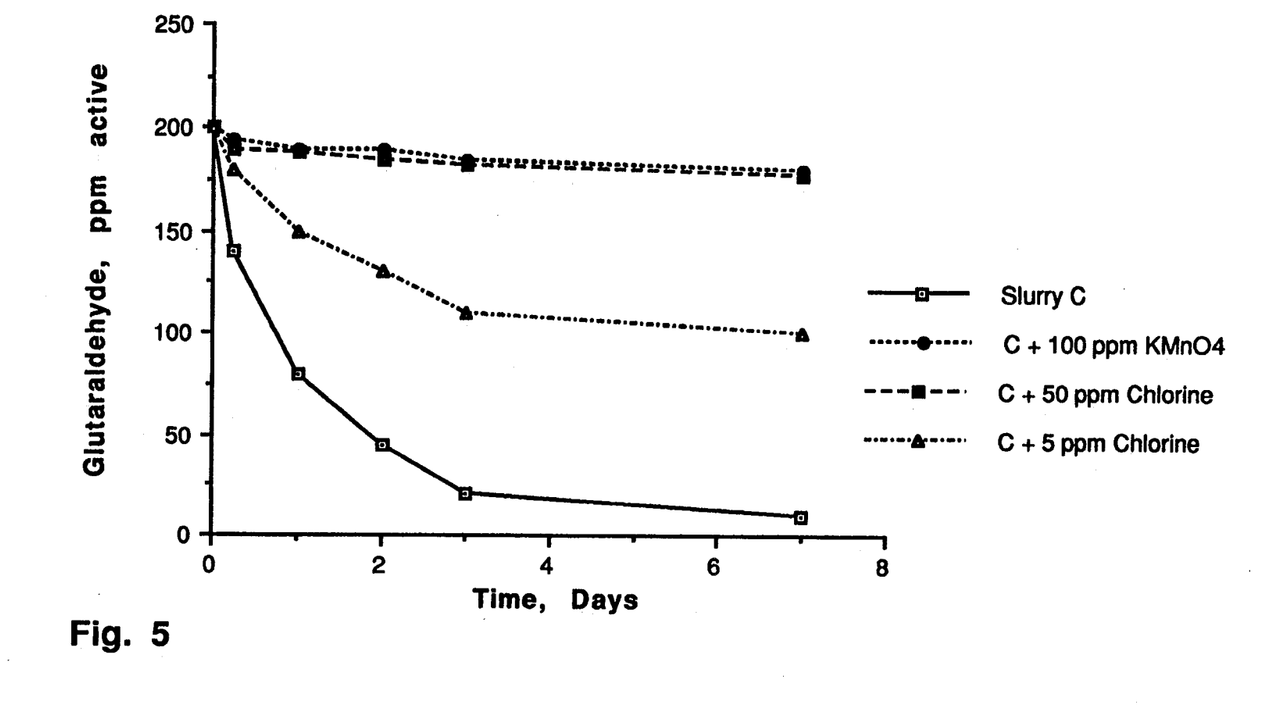
FIG. 5 is a graph demonstrating the concentration of glutaraldehyde stabilized with various oxidizers in kaolin slurries as a function of time.

FIG. 5 illustrates the effect of different oxidizers on glutaraldehyde stability. All the oxidizing agents were effective in stabilizing glutaraldehyde.

EXAMPLE 6

Effect of pretreatment with hydrogen peroxide on glutaraldehyde stability

To a 100 g sample of unstable kaolin slurry in a screw-capped bottle was added the desired amount of 1% solution of hydrogen peroxide. The solution was shaken and after an appropriate time period treated with 200 ppm a.i. glutaraldehyde on a weight/weight basis. The sample vial was then further shaken and stored at 25° C. At the desired time point a 10 g sample of the slurry was transferred to centrifuge tube and centrifuged for 20 minutes at 10,000 rpm. The glutaraldehyde content of the resulting supernatant was then analyzed by gas chromatography.

Figure 6:
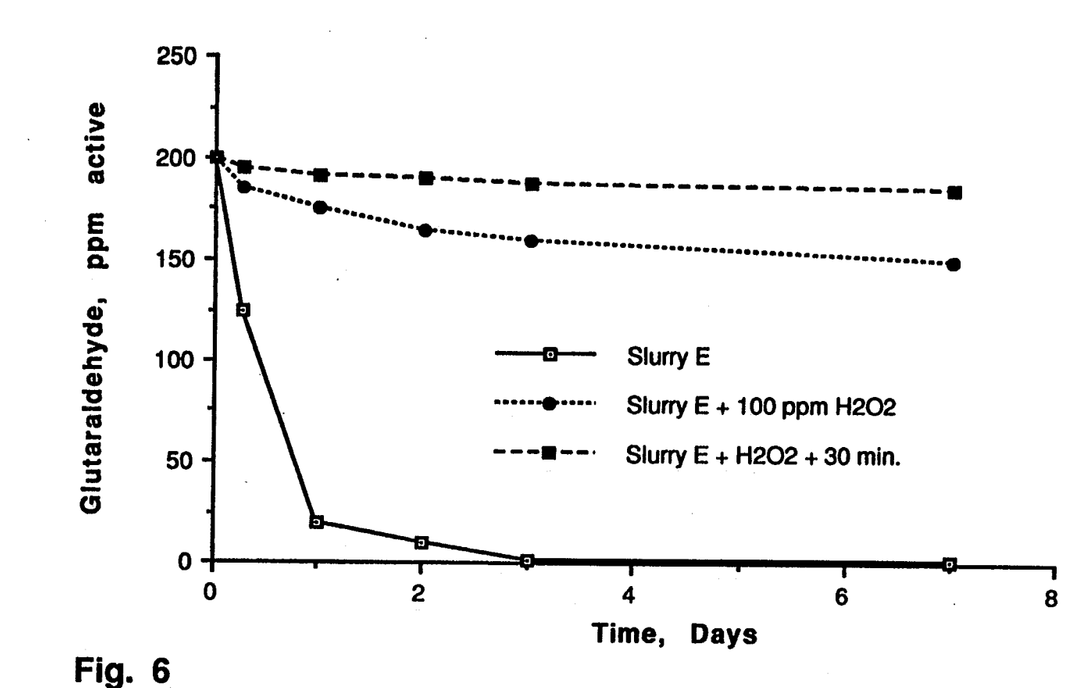
FIG. 6 is a graph demonstrating the effect pretreatment with hydrogen peroxide of a kaolin slurry has on the concentration of glutaraldehyde as a function of time.

In order to maximize the stabilizing effect of hydrogen peroxide, slurries treated with hydrogen peroxide were allowed to stand for 30 minutes prior to addition of glutaraldehyde. FIG. 6 compares glutaraldehyde stability in an incompatible slurry that had been treated with hydrogen peroxide immediately prior to glutaraldehyde addition and another that had been allowed to stand for 30 minutes prior to glutaraldehyde addition. Without wishing to be bound by any theory, it is believed that the pretreatment with hydrogen peroxide allows for a complete reaction with the agent that causes the undesired conversion of glutaraldehyde to a non-biocidal product, thereby resulting in maximum stability of the glutaraldehyde.

EXAMPLE 7

Efficacy of glutaraldehyde in kaolin slurries

To a set of 4 oz. sterilized bottles was added 100 g of an kaolin slurry. In experiments with unstable slurry, the mixture was treated with the desired amount of hydrogen peroxide prior to addition of glutaraldehyde. The desired concentration of glutaraldehyde was then added to each bottle leaving one bottle biocide-free to serve as a control. The bottles were shaken and stored at 25° C. for the desired amount of time. An aliquot of the slurry was then removed, serially diluted and plated using BHI agar for enumeration. The plates were incubated for 48 hours at 37° C. before counting.

Table I demonstrates the efficacy of glutaraldehyde before and after pretreatment of the slurry with 100 ppm hydrogen peroxide. Also demonstrated is the efficacy of 100 ppm hydrogen peroxide, which is a less effective biocide than glutaraldehyde. The efficacy of glutaraldehyde is significantly increased in the unstable slurry after pretreatment with peroxide.

TABLE 1

| GAppm*/H202 ppm | log reduction after* | |
|---|---|---|
| | 24 hrs. | 48 hrs. |
| 200/0 | 3.5 | 2.0 |
| 0/100 | 2.3 | 1.9 |
| 200/100 | 5.1 | 5.1 |

*5.1 represents complete kill
**GA = glutaraldehyde
***all concentrations are ppm (by weight) active ingredient Table 2 demonstrates the efficacy of glutaraldehyde before and after pretreatment of the slurry with 25 ppm hydrogen peroxide. Also demonstrated is the efficacy of 25 ppm hydrogen peroxide which is shown to be non-biocidal. The efficacy of glutaraldehyde is significantly increased in the unstable slurry after pretreatment with hydrogen peroxide.

TABLE 2

| GAppm*/H202 ppm | log reduction after* | |
|---|---|---|
| | 24 hrs. | 48 hrs. |
| 200/0 | .4.0 | 2.5 |
| 0/25 | 0.5 | 0.0 |
| 200/25 | 5.1 | 5.1 |

*5.1 represents complete kill
**GA = glutaraldehyde
***all concentrations are ppm (by weight) active ingredient Table 3 demonstrates the efficacy of glutaraldehyde in a slurry in which it is stable. Complete kill of the microorganisms is achieved within 24 hours.

TABLE 3

| GAppm* | log reduction after* | |
|---|---|---|
| | 24 hrs. | 48 hrs. |
| 100 | 6.1 | 6.1 |
| 150 | 6.1 | 6.1 |
| 200 | 6.1 | 6.1 |

*6.1 represents complete kill
**GA = glutaraldehyde
***all concentrations are ppm (by weight) active ingredient

I claim:

1. A method for stabilizing glutaraldehyde in a kaolin slurry containing an effective amount of glutaraldehyde to substantially kill or inhibit the growth of microorganisms in said slurry, which comprises providing an oxidizing agent to the kaolin slurry in an amount at least sufficient to substantially prevent the reaction of glutaraldehyde to delta-valerolactone.

2. The method of claim 1 wherein the oxidizing agent is added at a concentration of from about 5 to about 400 parts per million.

3. The method of claim 1 wherein hydrogen peroxide is the oxidizing agent.

4. The method of claim 3 wherein at least 90% of the glutaraldehyde in the slurry remains seven days after providing the hydrogen peroxide to the slurry.

5. The method of claim 3 wherein the concentration of hydrogen peroxide is from 10 to 100 ppm.

6. The method of claim 1 wherein the oxidizer is provided to the kaolin slurry prior to the addition of glutaraldehyde.

7. The method of claim 6 wherein the oxidizing agent is allowed to disseminate throughout the kaolin slurry before the addition of the glutaraldehyde.

8. The method of claim 1 wherein the oxidizer is chlorine.

9. The method of claim 1 wherein the oxidizing agent is selected from the group consisting of hydrogen peroxide, chlorine, bromine and potassium permanganate.

10. In a method for stabilizing glutaraldehyde in a mineral slurry containing an effective amount of glutaraldehyde to substantially kill or inhibit the growth of microorganisms in said slurry, which comprises providing an oxidizing agent to the mineral slurry in an amount at least sufficient to substantially prevent the reaction of glutaraldehyde to delta-valerolactone:

the improvement wherein the oxidizing agent is provided to the slurry prior to the addition of glutaraldehyde.

11. The method of claim 10 wherein the oxidizing agent is allowed to disseminate throughout the slurry before the addition of the glutaraldehyde.

12. The method of claim 11 Wherein the oxidizing agent is provided to the slurry about 30 minutes prior to the addition of the glutaraldehyde.

13. The method of claim 10 wherein at least 90% of the glutaraldehyde in the slurry remains seven days after providing the hydrogen peroxide and glutaraldehyde to the slurry.

14. The method of claim 10 wherein the mineral slurry is selected from the group consisting of kaolin, calcium carbonate, titanium dioxide and bentonite clay slurries.

15. The method of claim 10 wherein the oxidizing agent is selected from the group consisting of hydrogen peroxide, chlorine, bromine and potassium permanganate.

16. In a method for stabilizing glutaraldehyde in a kaolin slurry containing an effective amount of glutaraldehyde to substantially kill or inhibit the growth of microorganisms in said slurry, which comprises providing hydrogen peroxide to the slurry to stabilize the glutaraldehyde:

the improvement wherein the hydrogen peroxide is allowed to disseminate throughout the slurry before the addition of the glutaraldehyde such that at least 90% of the glutaraldehyde in the slurry remains seven days after providing the hydrogen peroxide and glutaraldehyde to the slurry.

* * * * *